(12) United States Patent
Chipchase

(10) Patent No.: US 8,391,929 B2
(45) Date of Patent: *Mar. 5, 2013

(54) USER INTERFACE

(75) Inventor: Jan Chipchase, Tokyo (JP)

(73) Assignee: Core Wireless Licensing S.A.R.L., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/531,702

(22) Filed: Jun. 25, 2012

(65) Prior Publication Data

US 2012/0258778 A1    Oct. 11, 2012

Related U.S. Application Data

(63) Continuation of application No. 11/988,016, filed as application No. PCT/IB2005/002378 on Jun. 30, 2005, now Pat. No. 8,229,508.

(51) Int. Cl.
*G06F 3/041* (2006.01)
*H04W 88/02* (2009.01)

(52) U.S. Cl. .................. 455/566; 379/142.04

(58) Field of Classification Search ......... 455/550.1, 455/566, 575.1–575.9, 556.1, 556.2; 379/142.1–142.18, 188, 356.01; 345/156–184
See application file for complete search history.

(56) References Cited

U.S. PATENT DOCUMENTS

| | | | | |
|---|---|---|---|---|
| 5,452,346 | A * | 9/1995 | Miyamoto | 379/142.04 |
| 6,243,459 | B1 * | 6/2001 | Cannon et al. | 379/356.01 |
| 2002/0086702 | A1 * | 7/2002 | Lai et al. | 455/556 |
| 2004/0001073 | A1 | 1/2004 | Chipchase | |
| 2004/0212598 | A1 * | 10/2004 | Kraus et al. | 345/168 |
| 2007/0013662 | A1 * | 1/2007 | Fauth | 345/168 |

FOREIGN PATENT DOCUMENTS

| | | |
|---|---|---|
| KR | 100317308 B1 | 11/2001 |
| WO | WO 01/67725 A2 | 9/2001 |
| WO | 2007/003981 A1 | 1/2007 |

OTHER PUBLICATIONS

International Search Report corresponding to International Application No. PCT/IB2005/002378 dated Jan. 26, 2006. submitted in parent U.S. Appl. No. 11/988,016.

European Office Action corresponding to European patent application No. 05766794.1 dated Apr. 13, 2010. submitted in parent U.S. Appl. No. 11/988,016.

European Search Report dated Jul. 16, 2012 corresponding to European Patent Application No. 12164015.5.

* cited by examiner

*Primary Examiner* — Kamran Afshar
*Assistant Examiner* — Kashif Siddiqui
(74) *Attorney, Agent, or Firm* — Squire Sanders (US) LLP

(57) ABSTRACT

An electronic device comprising: a display; a housing enclosing the display and defining an exterior surface region adjacent to the display, the exterior surface region having a plurality of surface zones indicated thereon, the surface zones being capable of being written on by a user to save a written marking thereon; a memory; and user input apparatus; the device having: a first mode in which the device performs a function in respect of a subject entity and in which in response to operation of the user input apparatus to indicate one of the zones the device stores the entity in the memory in association with that zone; and a second mode in which in response to selection of a zone by means of the user input apparatus the device performs a function in respect of an entity stored in association with the selected zone.

10 Claims, 3 Drawing Sheets

USER INTERFACE

REFERENCE TO RELATED APPLICATIONS

This is a Continuation of application Ser. No. 11/988,016 filed Apr. 27, 2010 which is a 371 of International Application No. PCT/IB2005/002378 filed Jun. 30, 2005. The disclosure of the prior application(s) is hereby incorporated by reference herein in its entirety.

This invention relates to a user interface for an electronic device such as a mobile phone.

A popular feature of mobile phones is their ability to store frequently used numbers in a memory, each associated with a name. The numbers can be recalled by entering the associated name. This "phonebook" function avoids the need for the user to memorise the phone numbers. It also avoids the user running up unwanted phone bills by wrongly entering the number he wants to call.

As low-end mobile phones become less expensive, they are increasingly bought by people who have little experience of advanced technology. Such people might find it difficult to operate functions such as the phonebook function because conventionally it demands a potentially complex series of keystrokes to store names and numbers and to and recall numbers by name. Also, such people might well have a limited ability to read. As a result they might find it difficult to read a user's manual and learn the functionality of their phone and to follow on-screen prompts or help. Most significantly, they might not be able to enter names in a phonebook, either to store or recall numbers. However, those people are the ones who are most likely to suffer from running up unwanted phone bills by entering wrongly entering numbers.

The phonebook function is just one example of the areas where concerns of this type arise. Others include entering text for text messaging and storing reminders in a calendar function.

There is therefore a need for an improved data entry scheme that can be applied to operations such as the phonebook function.

According to one aspect of the present invention there is provided an electronic device comprising a display; a housing enclosing the display and defining an exterior surface region adjacent to the display, the exterior surface region having a plurality of surface zones indicated thereon, the surface zones being capable of being written on by a user to save a written marking thereon; a memory; and user input apparatus; the device having a first mode in which the device performs a function in respect of a subject entity and in which in response to operation of the user input apparatus to indicate one of the zones the device stores the entity in the memory in association with that zone; and a second mode in which in response to selection of a zone by means of the user input apparatus the device performs a function in respect of an entity stored in association with the selected zone.

Preferably the exterior surface region surrounds the display. Preferably the exterior surface region comprises a cover releasably attachable to the remainder of the device. Preferably the cover is in the form of a sheet.

Suitably the device comprises a plurality of covers capable of being located adjacent to the display and preferably the device is capable of identifying which of the covers is externally visible adjacent to the display and the zones the subject of the first and second modes are those of that cover.

Preferably the device is physically reconfigurable and has a first configuration in which the exterior surface region is covered and a second configuration in which it is exposed.

Suitably, in the first mode the device performs a function in respect of a subject entity that has been input to the device independently of the user input means of the device.

Suitably, in the first mode the said function is receiving a communication and the entity is the identity of the originator of the communication. Suitably, the entity is a phone number.

Suitably, in the second mode the said function is originating a communication to the entity.

The present invention will now be described by way of example with reference to the drawings.

Figure 1:
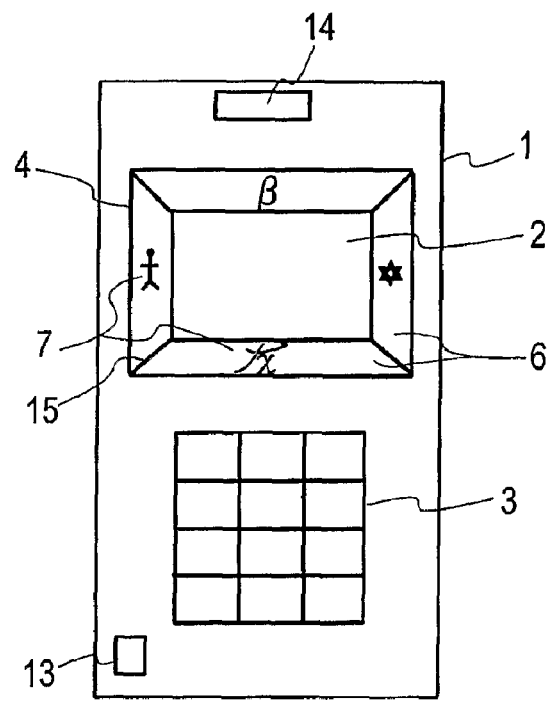
FIG. 1 shows a schematic view of an electronic device.

In a first embodiment of the invention, as illustrated in FIG. 1, a mobile phone 1 has a display 2 and a keypad 3. The display is surrounded by housing of the phone, part of whose surface defines a write-on area 4. The interaction of the display and the keypad with each other and with the other functionality of the phone is controlled by a processor 5, shown in FIG. 2. The processor is programmed with software to provide the required functionality, although it could alternatively be hard wired. The write-on area is subdivided into a number of zones 6. The phone is configured so that it can indicate any of those zones by means of the display, and when a user selection is then made it can provide functionality in dependence on which of the zones is being indicated at that moment. The user can write his own signs 7 on each zone to indicate in his own way what functionality is provided when it is selected. The phone does not need to be able to recognize the mnemonics/icons/character set of the user, and the user does not need to be able to understand the language in which the phone is used. Thus, in addition to facilitating use by people with poor literacy, this arrangement reduces the need for the device to be customized for local languages.

Figure 2:
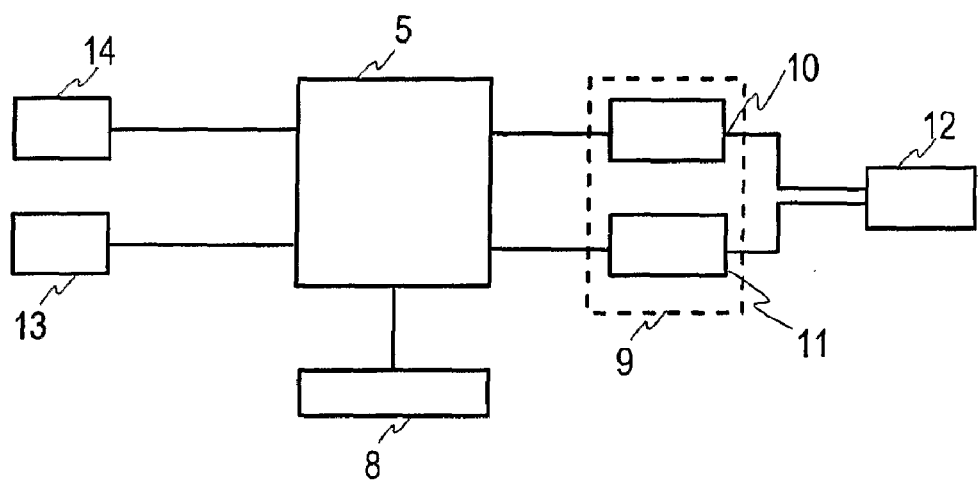
FIG. 2 shows a schematic view of functional elements of the electronic device.

Functional elements of the phone of FIG. 1 are shown in FIG. 2. The phone includes a memory 8 which stores software for execution by the processor. The phone has a phone engine 9 which allows it to communicate with a mobile phone network. The phone engine has a receiver unit 10 and a transmitter unit 11 which are each linked to both the processor 5 and to an antenna 12. The phone also has a microphone 13 and a speaker 14 whereby the user can input audio data to and hear audio data from the processor when engaged in a call. During a call the processor sends and receives that data over the network via the phone engine 9 in the normal way.

The write-on area 4 preferably surrounds the display. However, it could run along only one, two or three sides of the display.

The zones are preferably demarcated from each other by visible markings 15 on the write-on area itself. However, they could be demarcated by visible markings adjacent to but not on the write-on area. The zones may be demarcated by markings displayed on the display adjacent to the write-on area. The markings need not be visual: they could, for example, be tactile markings such as raised lines. There could alternatively be no markings separating the zones.

Zones could be indicated by the display in a number of ways. For example, a zone could be indicated by an arrow or the like shown on the display and pointing to the indicated zone. Alternatively, a zone could be indicated by a marker that is shown on the display and indicates the zone closest to where it is shown. A zone could be further indicated by lighting means arranged to preferentially illuminate the zone.

This may be achieved by positioning a light emitter behind each zone and the write-on zone may be translucent or transparent.

The zones may be variable in size. One way of achieving this is to allow the user to define the size of each zone through the user interface of the device. By manipulating an arrow or arrows displayed on the display screen the required starting point and ending point of a zone may be defined and stored in the memory of the device. The user may define the zone size through a configuration function of the device, or the user may be required to define the size of a zone when associating that zone with a particular party (see FIG. 4). Instead of manually defining the size of each zone or a set of zones, a user may select between predefined zone sizes. Each zone may be of a different size.

Preferably the device provides a mode in which the user can easily configure the zones and their operation. One example of such a mode is that when the device is performing or has recently (e.g. within a predetermined time period previously) performed a first function that is associated with an entity, the display indicates one of the zones. With the device in that state the user can provide input to the device to indicate that the indicated zone or another zone is to be associated with the entity. This input is preferably by means of a dedicated input device, such as a dedicated push button. Each zone itself could function as a button, allowing a user to indicate the zone with which the entity is to be associated by depressing the region corresponding to that zone. This may be achieved by having a dome-type switch underneath each zone. In response to the user input, the device stores in non-volatile memory that the entity and the indicated zone are associated. Subsequently, the user can cause the same zone to be indicated and can provide input to the device to indicate that that zone is to be selected. That input can be by means of the same or another input device. In response to that input the device automatically performs another function that is associated with the entity.

Examples of the first function include receiving a phone call, receiving a text or multimedia message, presenting the user with a reminder, making a phone call to a manually entered number, and sending a text message to a manually entered address. Examples of the entity include a phone number, a network address, and a subject. Examples of the second function include making a phone call, sending a text or multimedia message and storing a reminder.

In one preferred example, during a predetermined period such as 10 seconds after the end of a phone call received on a phone the phone displays an arrow pointing to a zone on the display. If the user makes an input to select that zone whilst the arrow is displayed then the phone stores an association between that zone and the phone number from which the call was originated. (The receiving phone could determine the originating phone number from caller identity data provided by the phone network in the usual way). At that time the user can make a mark of his choosing on the appropriate zone in the write-on area of the phone. The mark is conveniently one that the user associates with the calling party. For example, if the calling party was the user's son then he could draw a picture of a boy. Subsequently, the user can cause the display to indicate the same zone and make a selection again. This causes the phone to dial the number that was stored in association with that zone. Thus, whenever the user wishes to make a call to a third party that is stored against a zone he need only recognise his own marking or mnemonic to dial. Thus, the user need not know the number of the calling party, nor how to write or read the name, and the phone need not recognise the mnemonic used by the user.

The device may be able to decide intelligently whether to indicate a zone when a first function is being or has recently been performed. Preferably it does not indicate a zone if the entity associated with the function is already stored in association with a zone. Thus if a call is received from a number that is already stored against a zone then no zone would be offered for storage following that call. Preferably no zone would be offered for storage following an incoming call for which no calling line identifier (CLI) information is provided. This may be the case if the calling party chooses to withhold his or her number.

The device may be able to decide intelligently which zone to indicate when a first function is being or has recently been performed. Preferably it does not indicate a zone which already has an entity stored against it, although most preferably it does nevertheless do so if all zones are already full.

The user can preferably scroll through the zones when one is to be selected for storage or recall. This is preferably done using a scrolling means of the user interface, for example an input wheel or up and down buttons.

The write-on area can most preferably be written on using a standard writing implement such as a pencil or pen. The area of the device underlying each zone may be touch sensitive (preferably to greater localised pressure than would be encountered during normal usage conditions) so that the user's writing on the zone could provide the input needed to select a zone for storage. In that situation the device need not indicate a zone at the time of storage. The write-on area could, for instance, be made of plastics material or of paper or card. The write-on area is preferably constituted by a piece of sheet material which can be releasably attached to the device, for example by clip fastening means. In that way the area can be replaced if all the zones are full and the user wants to reconfigure them.

The device may be physically reconfigurable. For example, it may have two parts that can be folded to or from each other or slid over each other. This action may mean that some surface regions of the device are covered in one configuration and exposed in another configuration. Preferably the write-on region is located on such a surface. This has several advantages. First, markings on write-on region can be protected from being rubbed out by being covered up, for instance when the device is being carried around. Second, the user may perceive there to be a stigma associated with his using pictorial markings rather than words. If the markings are hidden when the device is being carried around then he may feel more content to use the present feature. It is preferred that in the most compact configuration of the device, which is typically the one in which it would be carried around, the zones are covered. It is preferred that in an in-use configuration of the device the zones are exposed.

Figure 3:
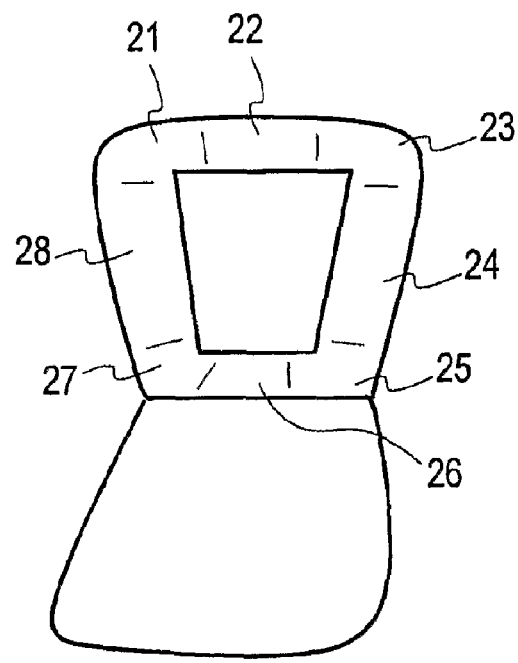
FIGS. 3 to 5 show an electronic device in operation.

FIG. 3 shows an embodiment of the invention implemented on a folding mobile phone. The area surrounding the display, hereinafter the "phonebook area", is divided into a number of zones. FIG. 3 shows the regions numbered 21 to 28. The user can write whatever he likes in the regions as shown in FIG. 4.

Figure 4:
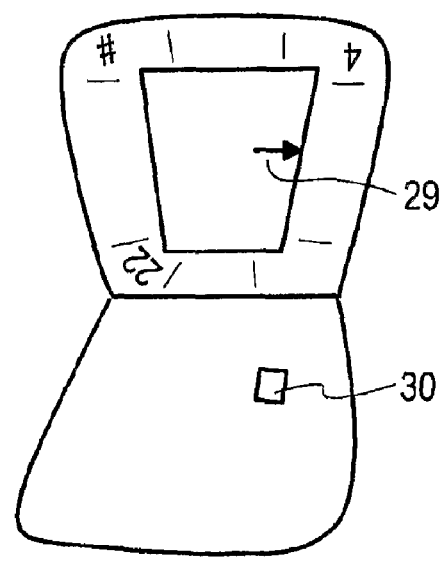

FIG. 4 shows a mobile phone of a preferred embodiment after an incoming call in which the CLI (calling line identifier) information has not been recognized by the phone. An arrow 29 on the display points to one of the regions which is still blank and the user makes a personal marking in the region to which the arrow is pointing. The personal marking serves as a mnemonic representing the identity of the calling party. The user then presses a key 30 on the keypad to make an association between the calling party and the region. FIG. 4 shows that the user has 3 parties registered in his phonebook.

Figure 5:
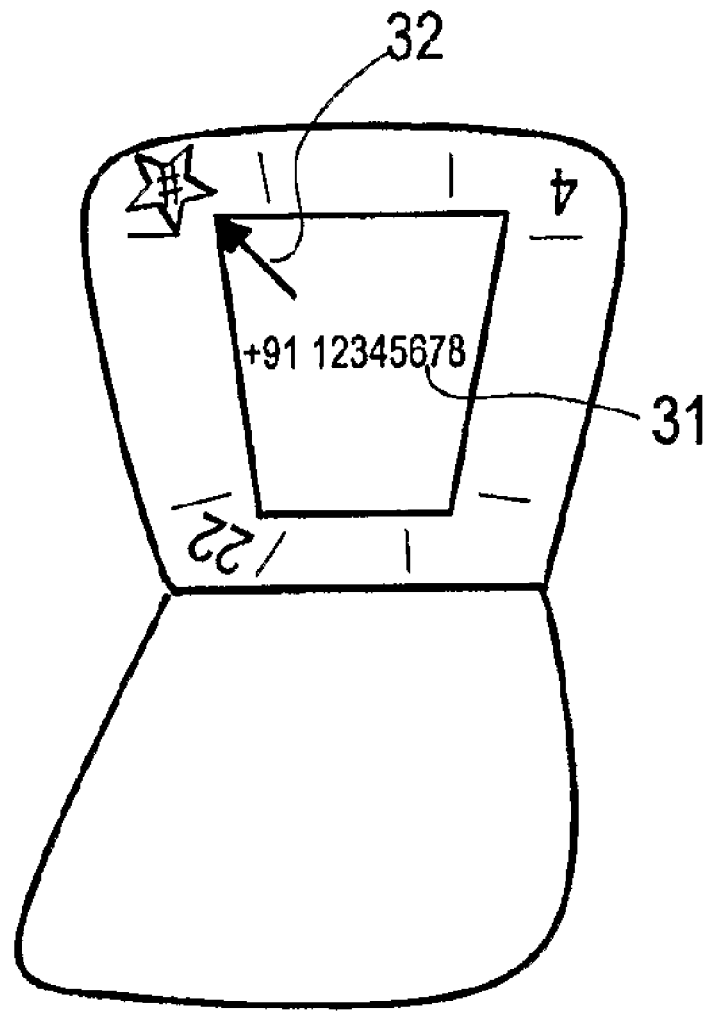

When, at a later date, the user receives a call from a party in his phonebook, the party's CLI 31 is recognized by the phone and an arrow 32 points to the associated region, as shown in FIG. 5. The user then only needs to recognize his mnemonic representing the calling party to know who is calling. Similarly, when making an outgoing call the user need only rotate to the selected region and then initiate the call using one or more keys on the keypad.

The phonebook area can be a clip-on rectangular ring of writeable plastic material having the regions delineations pre-marked thereon. It is preferably removable. Alternatively, a rectangular ring of paper can also be used, the paper being attached to the device by, for example, being trapped in situ by a transparent overlay hingedly mounted or clipped to the display part of the phone.

The user may require the facility to store data against more zones than would conveniently fit around or be indicated by the display. In that situation the device could be provided with multiple write-on sheets that can be positioned against the display and which are provided with means for interacting with the device so that the device can detect which of the sheets is visible next to the display. Then the device can associate each zone of each sheet with respective information, and allow data to be stored against each zone in dependence on which sheet is visible against the display. One way to implement this is for each sheet to be provided with shaped identifiers such as projecting tabs that uniquely identify it and allow its presence to be sensed by the device. Another way to implement it is for a set of sheets to be hingeably connected to the device so that they can be folded into position over the display. A sensing arrangement in the hinge could allow the device to detect which sheet is uppermost over the display. The arrangement may be like a conventional ring-bound notepad. The sheets may be hinged about the same axis as other parts of the device are hinged: for instance if it is a two-part hinged phone the sheets could hinge about the same axis as the phone parts. The sheets are preferably of fairly stiff plastic material.

The sheets are preferably sized and located so as not to cover a user interface portion of the device. Thus the user can flick through the sheets whilst remaining able to conveniently operate the user interface portion. If a device having multiple write-on sheets receives a call from a known entity, a number or symbol may be displayed adjacent to the arrow indicating the zone corresponding to the calling entity to further indicate on which of the sheets the relevant personal marking is displayed.

There may be instances in which a user wishes to delete an association between a personal marking and a particular entity. To achieve this the user may provide input to the device to indicate the zone corresponding to the personal marking. This input may be by any of the input means discussed above. The user may then provide a further input to delete the association between that zone and the particular entity which is stored in the device memory. This input may be a dedicated delete button and the delete button may be identified by a delete icon. To complete the process the personal marking is deleted by any conventional method suitable for removing the particular ink used from the particular write-on sheet material upon which the marking was made. Suitably the sheet material is chosen so that many common inks may be readily removed.

A device may be operable to transfer data associating a set of personal markings with a set of entities to another device. This involves two stages: transferring at least the portion of the phonebook area on which the user's personal markings are displayed and transferring the data associating the set of zones into which the phonebook area is divided with the set of entities. Preferably, the portion of the phonebook area on which the user's personal markings are displayed is detachable in order to allow the user to manually transfer that portion of the phonebook area between devices (the first stage). The second stage of transferring data between the devices may be performed by any means known in the art: by communicating the data over a communications network to which the device is subscribed; via a wire link between devices (suitably, this may be performed at a device service centre); via a wireless link between devices, such as Bluetooth; by writing the data to an active RF (radio frequency) tag at the source device and bringing the two devices into sufficiently close proximity for an RF tag reader in the destination device to read the data into the memory of the destination device, hence transferring the data from the source devices to the destination device.

Alternatively, the device may be a mobile phone and the data associating the set of zones into which the phonebook area is divided with the set of entities may be stored on the SIM card (subscriber identifier module) of the phone. The data may therefore be transferred from a first device to a second device by moving the SIM card from the first device to the second device and transferring the user's personal markings as described above.

The device need not be a mobile phone. It could, for example be a camera, a calculator or a PDA (personal digital assistant).

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An electronic device comprising:
    a display;
    a housing enclosing the display and defining an exterior surface region adjacent to the display, the exterior surface region having a plurality of surface zones, the surface zones being capable of being selected by a user;
    a memory;
    wherein
    a first mode in the device performs a function in respect of a subject entity;
    the display displays an indicator associated with at least one of the zones at a time proximate to performing the function in respect of the subject entity; and
    in response to selection by the user to indicate one of the zones the device stores the entity in the memory in association with that zone; the device having
    a second mode in which in response to selection of a zone the device performs a function in respect of an entity stored in association with the selected zone.

2. An electronic device as claimed in claim 1, wherein the surface zones are capable of being written on by a user to save the written marking thereon.

3. An electronic device as claimed in claim 1, wherein the exterior surface region surrounds the display.

4. An electronic device as claimed in claim 1, wherein the exterior surface region comprises a cover releasably attachable to the remainder of the device.

5. An electronic device as claimed in claim 4, wherein the cover is in the form of a sheet.

6. An electronic device as claimed in claim 4, comprising a plurality of covers capable of being located adjacent to the display.

7. An electronic device as claimed in claim 6, wherein the device is capable of identifying which of the covers is externally visible adjacent to the display and the zones the subject of the first and second modes are those of that cover.

8. An electronic device as claimed in claim 1, wherein the device is physically reconfigurable and has a first configuration in which the exterior surface region is covered and a second configuration in which it is exposed.

9. An electronic device as claimed in claim 1, wherein in the second mode the said function is originating a communication to the entity.

10. An electronic device as claimed in claim 1, wherein in the first mode the said function is receiving a communication and the entity is the identity of the originator of the communication.

\* \* \* \* \*